Oct. 7, 1941.     A. G. BEAL     2,257,998
UNIT RECORDER
Filed Oct. 19, 1939     3 Sheets-Sheet 1
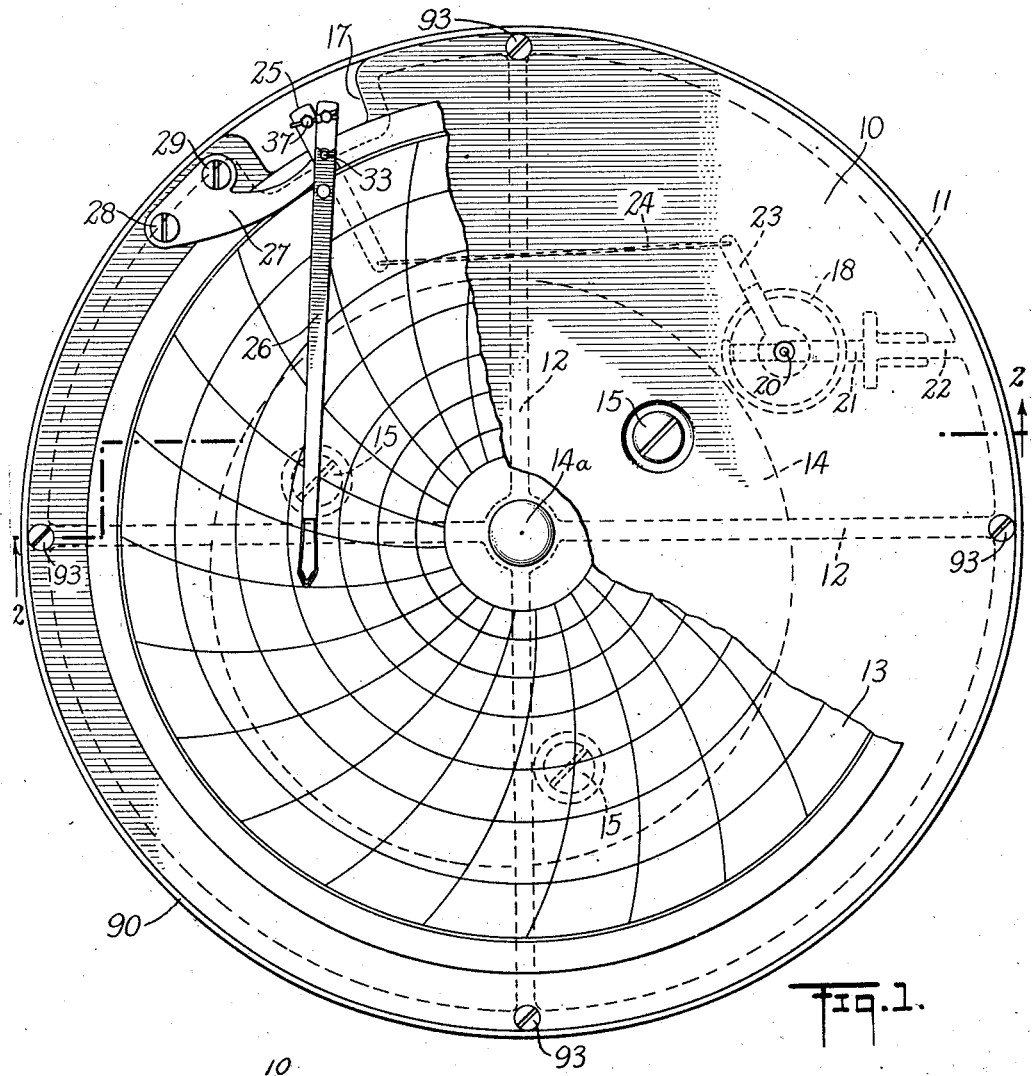
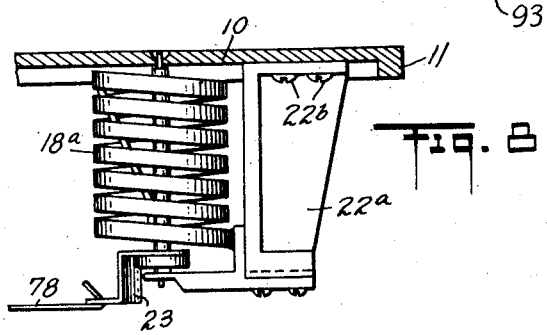
INVENTOR
Arthur G. Beal
BY
Blair, Curtis, Dunne & Hayward
ATTORNEYS

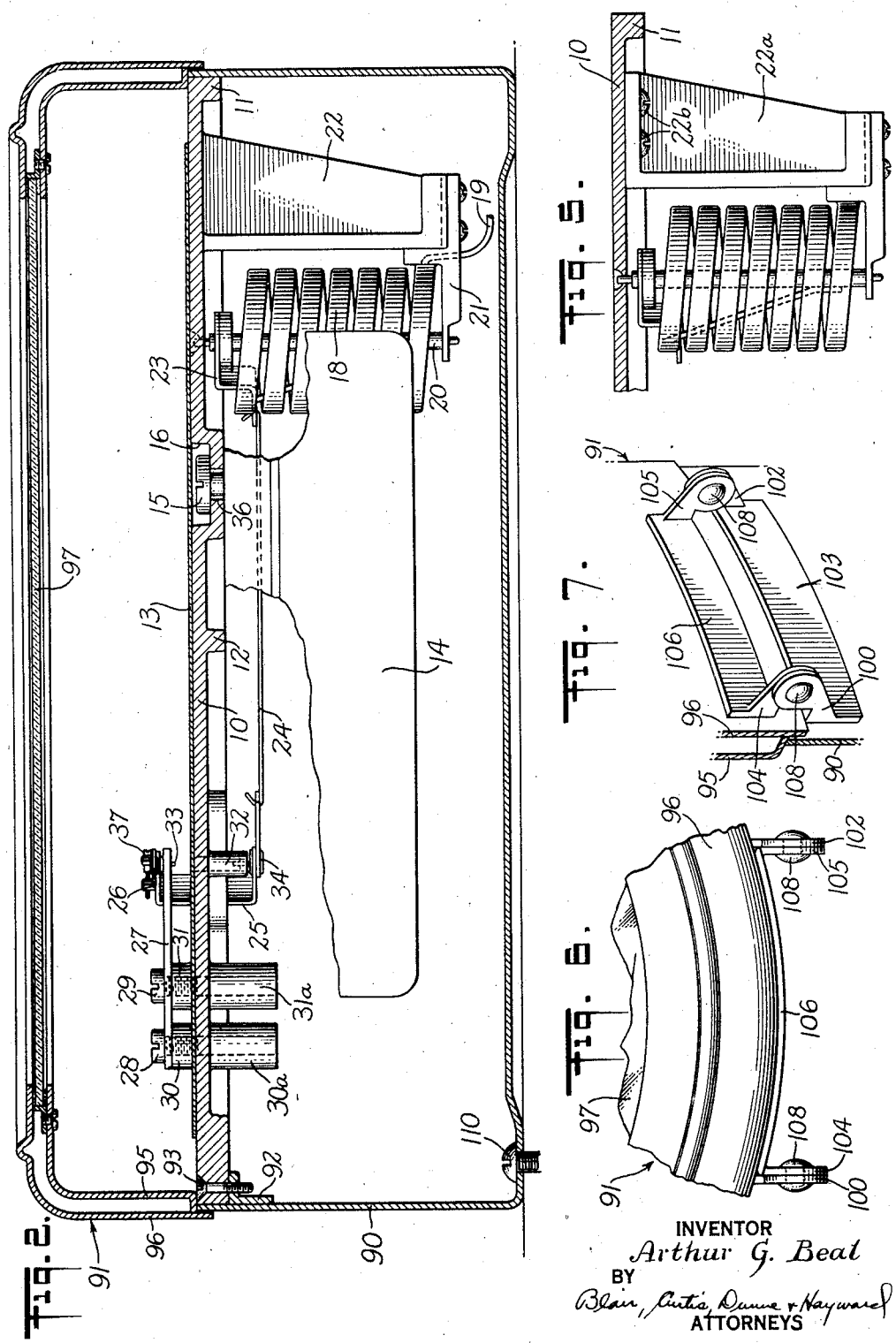

Oct. 7, 1941.                    A. G. BEAL                    2,257,998
                               UNIT RECORDER
                          Filed Oct. 19, 1939            3 Sheets-Sheet 3

INVENTOR
Arthur G. Beal
BY
Blair, Curtis, Dunne & Hayward
ATTORNEYS

Patented Oct. 7, 1941

2,257,998

UNITED STATES PATENT OFFICE 2,257,998

UNIT RECORDER

Arthur G. Beal, Foxboro, Mass., assignor to The Foxboro Company, Foxboro, Mass., a corporation of Massachusetts Application October 19, 1939, Serial No. 300,122

2 Claims. (Cl. 234—72)

This invention relates to improvements in instrument construction.

According to current practice, instruments of the character generally referred to as recorders or recorder controllers include a casing formed from a rigid, heavy casting, to the bottom or sides of which are secured the instrument elements, such as the operating elements for the index or pen-arms and associated parts. While instruments so assembled have in general proved satisfactory, they have certain disadvantages, as their cost of manufacture is relatively high and the assembly work is difficult.

The present invention contemplates a novel and improved mounting for the instrument parts which is independent of the casing which thus functions only as a cover for the unit. By the contemplated arrangement a casing may be provided for each mounting unit or instrument, or several units may be mounted in a common casing, or several units may be mounted on a common panel and housed within a single protective cover. Accordingly this improved construction permits of greater adaptability and convenience than those embodied in recorders of conventional design, and may be utilized to advantage.

By reason further of the unit nature of the assembly which requires a casing only for protective purposes, the casing can be made of light-weight material whereby the overall weight of the instrument including the casing is materially reduced, without sacrificing in any way the required rigidity.

The contemplated movement assembly mounting further provides an arrangement by which a plurality of pen-arms or pointers may be mounted on the mounting plate to turn on a common center of motion, the plate and assembly being such that a one arm movement assembly may be built up in simple and convenient manner to an assembly providing for the movement of a greater number of pen-arms, as by converting a one-record instrument to a four-record instrument, for example. It is also proposed to mount the operating element or elements (helical pressure spring) on a support integral with the rigid mounting plate when the position of the spring or springs is standardized; but in cases where their positions are not standardized or where additional elements are required for a particular installation, the supports for the springs are such that they can be secured in simple manner to the under side of the rigid plate.

Other objects will be in part obvious and in part hereinafter pointed out in connection with the following analysis of this invention wherein are illustrated certain embodiments of the invention in detail.

In the drawings:

Figure 1 is a face view of an assembly mounting plate supporting a one-pen unit recorder;

Figure 2 is a cross-section along lines 2—2 of Figure 1, the housing casing being associated with the back section thereof;

Figure 5 is illustrative of a modified form of mounting for an operating element;

Figures 6 and 7 are detail views of the casing illustrated in Figure 2.

Figure 8 is a view similar to Figure 5 but with the ends of the pressure spring shaft reversed in relation to their respective bearings.

Figure 3:
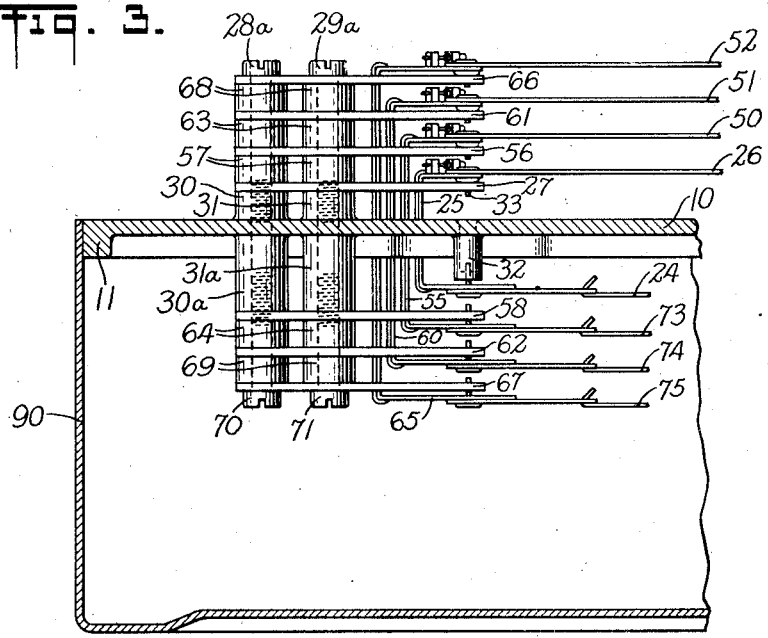
Figure 3 is a detail illustrating the manner of building up a one-pen movement assembly as illustrated in Figure 2 to a four-pen movement assembly.

In the drawings, like reference characters designate like parts throughout the several views. Reference is made to the unit instrument shown in Figures 1 and 2 thereof which, for purpose of simple description, is a recorder incorporating a single index or pen-arm. This instrument includes a suitable assembly or mounting plate 10 which in the construction illustrated is circular and of sufficient thickness to provide a rigid support for the instrument elements mounted thereon. Preferably the plate is provided for strengthening purposes with a peripheral flange 11 and reinforcing cross-ribs 12, the flange and ribs extending from the rear face of the plate. The front face of the plate provides a backing for a rotating chart 13 driven by a clock motor 14, secured against the rear of the plate by a plurality of headed screws 15 whose heads seat in reentrant portions shown as recesses or depressions 16 formed in and opening to the front of the plate. A chart driving hub 14a extends through the plate from the clock and is provided with suitable chart clamping facilities for holding and driving the chart.

Also carried by the plate and on the rear face thereof is an index or pen-arm operating element 18 which may be responsive to a thermometer bulb (not shown) or to a pressure-sensitive system (not shown), but in either instance the responsive element 18 comprises a curved tubular spring which is hollow and which expands or contracts in the known manner to changes within it. As shown in the drawings, the responsive element is helical and is connected by a capillary tube 19 with a thermometer bulb (not shown). The helical spring member is secured at one end but its other end is free to move. The movement is guided by a shaft 20 which is connected to the free end and is pivoted at one end in a removable bearing support 21 carried by a bracket member 22 preferably cast integrally with the plate 10 to extend from the rear face thereof. The other end of the shaft 20 is journaled directly in the rear face of the plate.

The operating element 18 is adapted to actuate a lever or crank 23 having one end secured to shaft 20. A link 24 extends from the other end of lever 23 and is connected with a U-shaft 25 whose axis of rotation is the center of motion for an index and pen-arm 26 arranged to move over the front face of the plate 10 and chart 13.

The cross part of the U-shaft 25 extends through a cut-out or notch 17 in the periphery of the plate 10 and its front leg is pivoted as at 33 in the inner end of a bracket plate 27. The other or outer end of the bracket plate is secured by the spaced screws 28 and 29 to two bosses 30 and 31, respectively, which are cast integrally with the plate adjacent the peripheral notch 17 to extend from the front face thereof. Cast with the plate to extend rearwardly thereof are bosses 30a and 31a which are aligned axially with the bosses 30 and 31. A common bore extends through bosses 30 and 30a and the intermediate plate 10. Similarly a common bore extends through bosses 31 and 31a and the intermediate plate. The bosses 30a, 31a on the under side of the plate 10 are not used with a one-pen movement assembly but provide means for mounting bracket plates on the under side of the plate 10 as necessary when building up a number of pen-movement assemblies as will be described hereinafter.

Also extending from the rear face of the plate 10 and preferably cast therewith is a boss 32 which is preferably hollowed out to receive the pivot 34 for the rear leg of shaft 25. The boss 32 is positioned to underlie the pivot 33, the pivots 33, 34 being coaxially related and constituting the axis of rotation of the shaft 25 and hence of the pen-movement assembly.

By reference to Figures 1 and 2, it will be seen that the link 24 extends sidewardly of the clock motor 14, the position of the operating element 18 being established in such a known position as to permit the link to be so accommodated. For a known or established position of the operating element the bracket member 22 is cast integrally with the plate 10 as illustrated.

The pivots 33 and 34 provide a fixed axis for the pen movement assembly in relation to the axis of chart 13. Minor adjustment of said axis of chart 13 is provided for in the mounting of the clock motor which determines the position of hub 14a and therefore the axis of said chart. As shown in Figure 2, plate 10 has openings 36 of larger diameter than that of the shanks of screws 15. Thus, when said screws extend through said openings in position for fastening the motor to plate 10 as above described, the position of said screws in said openings may be varied laterally, thereby allowing corresponding adjustment of the position of the motor.

It will be understood that the operating or responsive element 18 responds to changes in the condition being measured to turn shaft 20, the motion of which is transmitted through element lever 23, link 24, and U-shaft 25, to arm 26 which in the embodiment shown carries a pen for recording this movement on chart 13, all as generally disclosed in the Bristol et al. Patent No. 1,778,702, dated October 14, 1930. If desired, a micrometer adjustment mechanism 37 operative between the front leg of U-shaft 25 and pen-arm 26 may be provided, which may be that described in patent to E. H. Bristol No. 1,283,395, dated October 29, 1918. With the operating element 18 and the clock motor 14 carried by and at the rear side of the plate, and with the movement assembly utilizing the plate as an integral part thereof, it will be seen that the present invention provides a self-contained instrument unit as distinguished from instruments of conventional design which utilize a heavy cast casing as a support for the instrument elements.

Where more than one pen-arm or index arm is needed, the movement assembly as above described and as shown in Figures 1 and 2 may be modified as desired. Figure 3 illustrates a four-pen movement assembly evolved therefrom to provide for movement of the additional pen-arms 50, 51 and 52, for example. Pen-arm 50 is actuated by U-shaft 55 pivoting with reference to an outer bracket plate 56 spaced from the bracket plate 27 by spacing bushings 57, and an under bracket plate 58 fixedly secured against the cast bosses 30a and 31a, described previously. In similar manner the additional pen-arm 51 is actuated through a U-shaft 60 pivoting in an outer bracket plate 61 and an under bracket plate 62, the plate 61 being spaced from plate 56 by spacing bushings 63 and the plate 62 being spaced from plate 58 by the spacing bushings 64. Likewise the fourth and relatively outer-most pen-arm 52 is arranged to pivot in outer bracket plate 66 and under bracket plate 67, such plates being spaced from plates 61 and 62, respectively, by spacing bushings 68 and 69. The relatively short screws 28 and 29 of the Figures 1 and 2 construction have been replaced by elongated screws 28a and 29a which extend through the bracket plates 66, 61, 56 and 27, and the bushings 57, 63, and 68 separating the same, and are threaded into the plate bosses 30 and 31. In similar manner screws 70 and 71 secure the under bracket plates 67, 62 and 58 and their spacing bushings 69 and 64 to the plate bosses 30a and 31a extending from the rear side of the plate 10.

As with the construction illustrated in Figures 1 and 2, it will be seen that the multi-arm movement assembly illustrated in Figure 3 incorporates the plate 10 as an integral part of the movement assembly and provides a fixed common center of rotation for the pen-arms 26, 50, 51 and 52. Even with the four-pen movement of the Figure 3 construction, this center of motion is maintained in the desired correct position due to the fact that the coaxially arranged pivots on which the pen-arms turn are maintained relatively close to the plate 10 which provides the mount for the assemblies.

Figure 4:
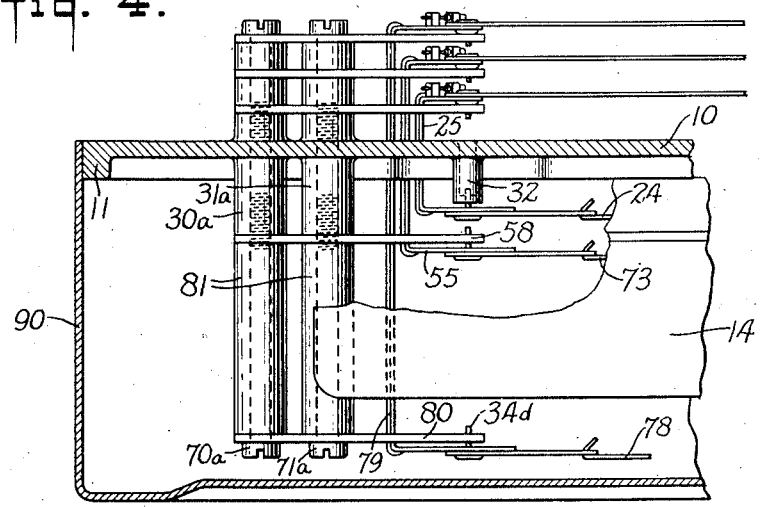
Figure 4 is a further modification illustrating a multi-pen assembly in which the operating link for one pen extends over the clock motor.

In the Figure 3 modification as described, the operating elements for the shafts 25, 55, 60 and 65 (which correspond in function to the arm-operating element or pressure spring 18 illustrated in Figures 1 and 2) are so disposed that the links 24, 73, 74 and 75, which extend between the elements and the U-shafts take up position to the side of the clock motor 14. The responsive or operating elements cannot be stacked one on top of the other and so must be separately mounted on the mounting plate. Where the responsive elements are larger and so occupy more room, it may be advisable that one or more of the connecting links between the responsive elements and the operating U-shafts pass over the clock motor rather than alongside it and the construction shown in Figure 4 illustrates the manner by which this arrangement may be carried out. In such a modified arrangement links 24 and 73 with their U-shafts 25 and 55 correspond to like numbered parts illustrated in Figure 3, the links 24 and 73 extending sidewardly of the clock to their related operating elements (not shown). A third link 78 is disposed to extend across the clock to transmit movement of an additional operating element to a U-shaft 79, the rear pivot 34d of which extends through a bracket plate 80 whose position is determined by the relatively long spacing bushings 81. Long screws 70a, 71a are substituted for the screws 70, 71 of the Figure 3 construction and secure bracket plate 80 in proper position while at the same time securing bracket plate 56 to the bosses 30a, 31a. With link 78 extending over the clock motor 14 the helical spring or responsive operating element 18a actuating the link would be reversed, as shown in Figure 8, and connection effected between the link 78 and the rear end of the operating element shaft (rather than the forward end as in Figures 1 and 2), whereby a substantially direct connection is obtained between the pivot of the movement assembly and the axial shaft of the actuating pressure spring or operating element 18a.

The bracket support 22 for the operating element 18 is shown in Figure 2 as cast integrally with plate 10 to extend from the rear side thereof when the position of the operating element is known. When it is desired to add additional movement assemblies and the operating elements, additional supports therefor, as brackets 22a illustrated in Figure 5 may be secured by screws 22b against the under face of the plate 10 at convenient locations.

One form of casing for the mounting plate assembly is illustrated in Figure 2, details being shown in Figures 6 and 7. Such a casing includes a back section 90 and hinged thereto a cover section generally indicated at 91. These sections may be fabricated from suitable lightweight metal formed to the desired shape as by a stamping operation.

Adjacent the forward or outer edge of the back section 90, spaced angle brackets 92 are provided, one flange of which is secured as by welding to the inner casing wall and the other flange extending into the section enclosure to provide a seat against which seats the plate flange 11. The positioning of the fastening brackets 92 is such that the outer or forward face of the plate 10 extends flush with the forward edge of the casing section. Securing screws 93 are threaded through the plate flange and the inwardly directed flange of the brackets 92 to secure the plate to the casing.

The cover section of the casing comprises spaced inner and outer rings 95 and 96, respectively, the lower end of the inner ring 95 being bent outwardly to seat against the peripheral edge portion of the plate 10, the lower edge of the outer ring 96 being pressed against the terminal lower edge of the ring 95 and lapping the upper edge of the rear or back casing section 90. The inner and outer rings of the cover section are provided with inwardly directed or radial flange portions between which is disposed a glass top 97 through which the index or pen-arms may be viewed without requiring opening of the cover section.

Figures 6 and 7 show a hinge construction between the back and cover sections of the casing, which includes spaced hinge ears 100 and 102 extending outwardly from an arcuate strap 103 secured to the outer face of the back section a sufficient distance to register with hinge ears 104 and 105 extending outwardly from an arcuate strap 106 secured to the outer ring 96 of the cover section. Hinge pins 108 extend through the related pairs of ears 100, 104 and 102, 105 and provide a pintle on the axis of which the casing cover may be swung to an open or closed position. A suitable latch mechanism (not shown) is provided to secure the cover section in its closed position with reference to the casing bottom.

For the purpose of securing the enclosed unit recorder to a wall support or mounting panel, the back section 90 of the casing is placed against the wall or panel at the desired location and thereupon screws 110, accessible from within the casing back section, are threaded through the back wall thereof into the supporting surface. The instrument unit comprising plate 10 and the instrument elements mounted thereon as aforesaid is next positioned in the casing opening to engage against the fastening brackets 92, and securing screws 93 are thereupon threaded through the plate and brackets to secure the instrument as illustrated in Figure 2.

While in Figure 2 there is illustrated a construction in which the protective casing individual to a recorder unit is shown, it will be understood that a plurality of such units may be enclosed within a common casing without material modification, and also that one or more unit recorders as described may be mounted directly on a supporting panel, with a common casing thereupon arranged about a unit or units and secured to the panel by means independent of the unit securing means. In all such constructions the casing will be fabricated from sheet metal or equivalent, as distinguished from the heavy, rigid castings necessary to recorders of conventional design, and the weight of the entire assembly accordingly will be greatly reduced.

As many changes could be made in carrying out the above constructions without departing from the scope of the invention, it is intended that all matter contained in the above description or shown in the accompanying drawings shall be interpreted as illustrative and not in a limiting sense.

I claim:

1. In a device of the class wherein a chart rotates in relation to a deflectable arm mounted at one side of a mounting plate with one end movable in an arc across said chart and the extent of said movement is controlled by variations in the condition of a responsive element mounted at the other side of said mounting plate, the combination of a fixed bearing at one side of said mounting plate and another fixed bearing at the opposite side thereof and co-axial with said first fixed bearing, a U shaft mounted in said bearings, said deflectable arm being secured to one leg of said U shaft, a bracket on said mounting plate presenting a bearing having a fixed relation to said bearings of said U shaft, said responsive element having a shaft mounted between said bearing of the bracket and said mounting plate, one end of said shaft being operatively connected to said U shaft, and a clock mechanism mounted on the same side of the mounting plate as the responsive element and having a chart driving hub extending through an opening in said mounting plate, said clock being secured to said plate by attaching means extending through said plate and adjustable in relation thereto for centering said chart carrying hub in operative relation to the axis of the U shaft.

2. A mounting for instrument assemblies of the kind wherein a clock mechanism including a chart driving hub rotates a chart and a responsive element actuates an arm across said chart, comprising a rigid chart supporting plate having a central opening, a clock mechanism supported at the rear face of said plate and having a chart driving hub, an element supporting bracket projecting from said rear face, an arm actuating element supported on said bracket, an element actuated arm having a fixed pivotal axis supported by said plate, said plate also having reentrant recessed portions and openings through said portions, and fastening means extending through said openings and laterally adjustable therein to secure said clock mechanism to the rear face of the plate in a position whereby said chart driving hub of said clock mechanism extends through said central opening of the plate and is adjustable in relation to said fixed pivotal axis of said arm.

ARTHUR G. BEAL.